(12) United States Patent
Chang et al.

(10) Patent No.: US 11,921,089 B2
(45) Date of Patent: Mar. 5, 2024

(54) METHOD FOR PERFORMING PRESS-FITTING TEST IN CONSIDERATION OF AMOUNT OF DEFORMATION OF LOAD CELL

(71) Applicant: FRONTICS. INC, Seoul (KR)

(72) Inventors: Hee Kwang Chang, Seoul (KR); Kwang Ho Kim, Seongnam-si (KR); Jeong Hwa Hong, Suwon-si (KR)

(73) Assignee: FRONTICS, INC. (KR)

( * ) Notice: Subject to any disclaimer, the term of this patent is extended or adjusted under 35 U.S.C. 154(b) by 379 days.

(21) Appl. No.: 17/431,477

(22) PCT Filed: Feb. 17, 2020

(86) PCT No.: PCT/KR2020/002223
§ 371 (c)(1),
(2) Date: Aug. 17, 2021

(87) PCT Pub. No.: WO2020/171503
PCT Pub. Date: Aug. 27, 2020

(65) Prior Publication Data
US 2022/0146388 A1    May 12, 2022

(30) Foreign Application Priority Data

Feb. 18, 2019   (KR) .......................... 10-2019-0018684

(51) Int. Cl.
*G01N 3/40*    (2006.01)
*G01N 3/06*    (2006.01)
(Continued)

(52) U.S. Cl.
CPC ................ *G01N 3/40* (2013.01); *G01N 3/06* (2013.01); *G01N 3/08* (2013.01); *G01N 1/42* (2013.01);
(Continued)

(58) Field of Classification Search
CPC ....... G01N 2203/0019; G01N 2203/06; G01N 2203/0682; G01N 2203/0033;
(Continued)

(56) References Cited

U.S. PATENT DOCUMENTS 7,472,603 B2   1/2009  Kim
7,487,051 B2   2/2009  Kim et al.
(Continued)

FOREIGN PATENT DOCUMENTS

JP    H07049298 A    2/1995
JP      2681913 B2   11/1997
(Continued)

OTHER PUBLICATIONS

Seo, Hae-Jun et al., "High Accurate Creep Compensation of the Loadcell using the Strain Gauge", Journal of IKEEE, Institute of Korean Electrical and Electronic Engineers, Mar. 2012, vol. 16, No. 1, pp. 34-44, see pp. 37-39.
International Search Report (in English and Korean) and Written Opinion of the ISA (in Korean) issued in PCT/KR2020/002223, dated May 22, 2020; ISA/KR.

*Primary Examiner* — Jonathan M Dunlap
(74) *Attorney, Agent, or Firm* — Harness, Dickey & Pierce, P.L.C.

(57) ABSTRACT

According to the embodiments disclosed herein, in a press-fitting test for measuring physical properties of a test object by pressing an indenter against the test object and measuring the load and displacement, the measured displacement value is corrected in real time in consideration of the amount of deformation according to the load of the load cell, and thus an accurate load-displacement curve can be derived, even when the amount of deformation of the load cell is included in a measured value of a displacement sensor.

2 Claims, 10 Drawing Sheets

(51) Int. Cl.
    *G01N 3/08*    (2006.01)
    *G01N 1/42*    (2006.01)
    *G01N 3/14*    (2006.01)

(52) U.S. Cl.
    CPC ....... *G01N 3/14* (2013.01); *G01N 2203/0019* (2013.01); *G01N 2203/0033* (2013.01); *G01N 2203/0078* (2013.01); *G01N 2203/06* (2013.01); *G01N 2203/0676* (2013.01); *G01N 2203/0682* (2013.01)

(58) Field of Classification Search
    CPC ... G01N 2203/0676; G01N 2203/0078; G01N 3/40; G01N 3/06; G01N 3/08; G01N 3/14; G01N 1/42
    See application file for complete search history.

(56) References Cited

U.S. PATENT DOCUMENTS

| | | | |
|---|---|---|---|
| 9,702,798 B1 | 7/2017 | Kim et al. | |
| 2008/0028840 A1* | 2/2008 | Smith | G01N 3/42 73/78 |
| 2009/0145196 A1* | 6/2009 | Kawazoe | G01N 3/42 73/1.89 |

FOREIGN PATENT DOCUMENTS

| | | |
|---|---|---|
| KR | 1020110057475 A | 6/2011 |
| KR | 102031195 B1 | 10/2019 |

* cited by examiner

METHOD FOR PERFORMING PRESS-FITTING TEST IN CONSIDERATION OF AMOUNT OF DEFORMATION OF LOAD CELL

CROSS-REFERENCE TO RELATED APPLICATION

This application is a U.S. National Phase Application under 35 U.S.C. 371 of International Application No. PCT/KR2020/002223, filed on Feb. 17, 2020, which claims priority, under 35 U.S.C. 119(a), to Korean Patent Application No. 10-2019-0018684 filed in the Korean Intellectual Property Office on Feb. 18, 2019. The entire disclosures of the above applications are incorporated by reference herein in their entirety.

TECHNICAL FIELD

The embodiments relate to methods for performing an indentation test considering the amount of deformation of a load cell and, more specifically, to methods for performing an indentation test, which may derive a precise load-displacement curve although a value measured by a displacement sensor contains an amount of deformation of a load cell by real-time correction of the measured displacement value considering the amount of deformation according to the load of the load cell in an indentation test that measures the physical properties of a test object by indenting the test object with an indenter and measuring the load and displacement.

BACKGROUND ART

An indentation test is a test that measures the physical properties of a material by applying a load to the material using a hard indenter and observing indentations to the material. There is ongoing rigorous research on instrumented indentation methods or continuous indentation methods that continuously measure the load and displacement while indentation is being conducted.

A continuous indentation method may evaluate such physical properties as elastic modulus, hardness, and stiffness through a continuous curve of loads and displacements measured and most advantageously may assess the contact depth by direct analysis of the load-displacement curve without optical observation of the area of the indentation and then calculate the geometric shape of the indenter to thereby evaluate the area of contact from the contact depth.

Further, because of leaving only a small indentation in the surface of the material as a non-destructive mechanical test, this method has advantages over conventional methods in that on-site, direct test for physical properties is possible, and local physical property evaluation through a test on a local area is possible is available in wide areas from macro to micro or nano. The method is also performed in the form of a macro indentation test that applies a macro-scale indentation depth and macro-unit load and may thereby conduct measurement on the physical properties of a specimen having a macro-scale thickness.

Meanwhile, according to Oliver et al. (2003), compliance, which is defined as displacement per unit load, is used to calculate elastic modulus (Young's modulus) of a material using a load-displacement curve. Compliance, which is the reciprocal of stiffness, is calculated as follows:

$$C_m = (dP/dh)^{-1} \quad \text{[Equation 1]}$$

P is the load and h is the displacement. That is, compliance is measured by calculating the reciprocal of the slope in the load-displacement curve.

However, since displacement occurs not only in the material but also in the indentation tester due to the load, it is necessary to consider the compliance of the indentation tester.

$$C_m = C_f + C_s \quad \text{[Equation 2]}$$

$C_f$ is the compliance of the indentation tester, and $C_s$ is the compliance of the material. That is, the indentation tester and the material are loaded in the same direction, so that the measured compliance ($C_m$) is expressed as the sum of the compliance of the indentation tester and the compliance of the material.

Further, the compliance and elastic modulus of the material have the following relationship:

$$C_1 = \frac{\sqrt{\pi}}{2E_r} \frac{1}{\sqrt{A}} \quad \text{[Equation 3]}$$

$$\frac{1}{E_r} = \frac{1-v^2}{E} + \frac{1-v_i^2}{E_i} \quad \text{[Equation 4]}$$

A is the contact area between the indenter and the material. Er is the reduced Young's modulus considering the indenter and is the Poisson's ratio (v) and elastic modulus (E) of the material, and Poisson's ratio ($v_i$) and elastic modulus ($E_i$) of the indenter.

In other words, from Equations 1 to 4 above, a linear function relationship between $C_m$ and $$\frac{1}{\sqrt{A}}$$

is driven. $C_m$ is measured from the load-displacement curve by performing the indentation test several times.

$$\frac{1}{\sqrt{A}}$$

is measured from the indentation. The elastic modulus of the material is calculated.

Meanwhile, conventional indentation testers are configured to have a displacement sensor coupled to the indenter shaft and a displacement part, in the form of a load cell, having a different shaft from the indenter shaft and to measure the displacement of the displacement part supported on a material when indented. If the material has a curved surface, e.g., if an indentation test is conducted not on a processed specimen but on an on-site structure, the conventional indentation testers may fail to accurately measure the displacement due to a slip of the load part on the curved surface that may arises from the fact that the displacement part and the indentation test have different shafts. Further, the conventional indentation testers are difficult to install in such a manner that the indenter shaft and the displacement sensor are provided in a vacuum chamber for providing a high temperature environment and thermal isolation to the material.

In the conventional indentation testers, since the displacement sensor is coupled to the indenter shaft and is positioned lower than the load cell, the measured value of the displacement sensor does not contain the amount of deformation of the load cell. However, if the displacement sensor is positioned higher than the load cell due to the above-described issues, the measured value of the displacement sensor is caused to contain the amount of deformation of the load cell. Thus, to derive a load-displacement curve like in a conventional indentation tester, a larger compliance ($C_f$) of the indentation tester needs to be applied.

However, although a larger compliance ($C_f$) of the indentation tester is applied, the elastic modulus may not precisely be measured due to a significant difference in the slope of curve in the unloading segment of the load-displacement curve. This is why Oliver et al. treats the compliance ($C_f$) of the indentation tester as a constant irrelevant to the load but, indeed, the amount of deformation of the load cell is not unrelated and, in other words, the compliance of the load cell has a non-constant value.

Therefore, a need arises for an indentation test method capable of deriving a load-displacement curve for a material considering the amount of deformation of a load cell in values measured by a displacement sensor.

DETAILED DESCRIPTION OF THE INVENTION

Technical Problem

The embodiments have been conceived in light of the foregoing background and aim to derive a precise load-displacement curve although a value measured by a displacement sensor contains an amount of deformation of a load cell by real-time correction of the measured displacement value considering the amount of deformation according to the load of the load cell in an indentation test that measures the physical properties of a test object by indenting the test object with an indenter and measuring the load and displacement.

The objects of the present invention are not limited to the foregoing and other objects will be apparent to one of ordinary skill in the art from the following detailed description.

Technical Solution

According to the present embodiments, there may be provided a method for performing an indentation test considering an amount of deformation of a load cell, comprising a first step of deriving a displacement function of the load cell according to a load by applying a load to an indentation module and measuring the applied load and a displacement, a second step of correcting a measured value of a displacement sensor considering the amount of deformation of the load cell derived from the displacement function of the load cell according to the load, and a third step of deriving a load-displacement curve from a corrected displacement value and a measured load value by applying a load to a test object with an indenter and measuring the applied load and displacement.

Advantageous Effects

According to the embodiments, it is possible to derive a precise load-displacement curve although a value measured by a displacement sensor contains an amount of deformation of a load cell by real-time correction of the measured displacement value considering the amount of deformation according to the load of the load cell in an indentation test that measures the physical properties of a test object by indenting the test object with an indenter and measuring the load and displacement.

MODE FOR CARRYING OUT THE INVENTION

Hereinafter, embodiments of the present embodiments are described in detail with reference to the accompanying drawings. The same or substantially the same reference denotations are used to refer to the same or substantially the same elements throughout the specification and the drawings. When determined to make the subject matter of the present invention unclear, the detailed description of the known configurations or functions may be skipped.

Such denotations as "first," "second," "A," "B," "(a)," and "(b)," may be used in describing the components of the present embodiments. These denotations are provided merely to distinguish a component from another, and the essence of the components is not limited by the denotations in light of order or sequence. When a component is described as "connected," "coupled," or "linked" to another component, the component may be directly connected or linked to the other component, but it should also be appreciated that other components may be "connected," "coupled," or "linked" between the components.

Figure 1:
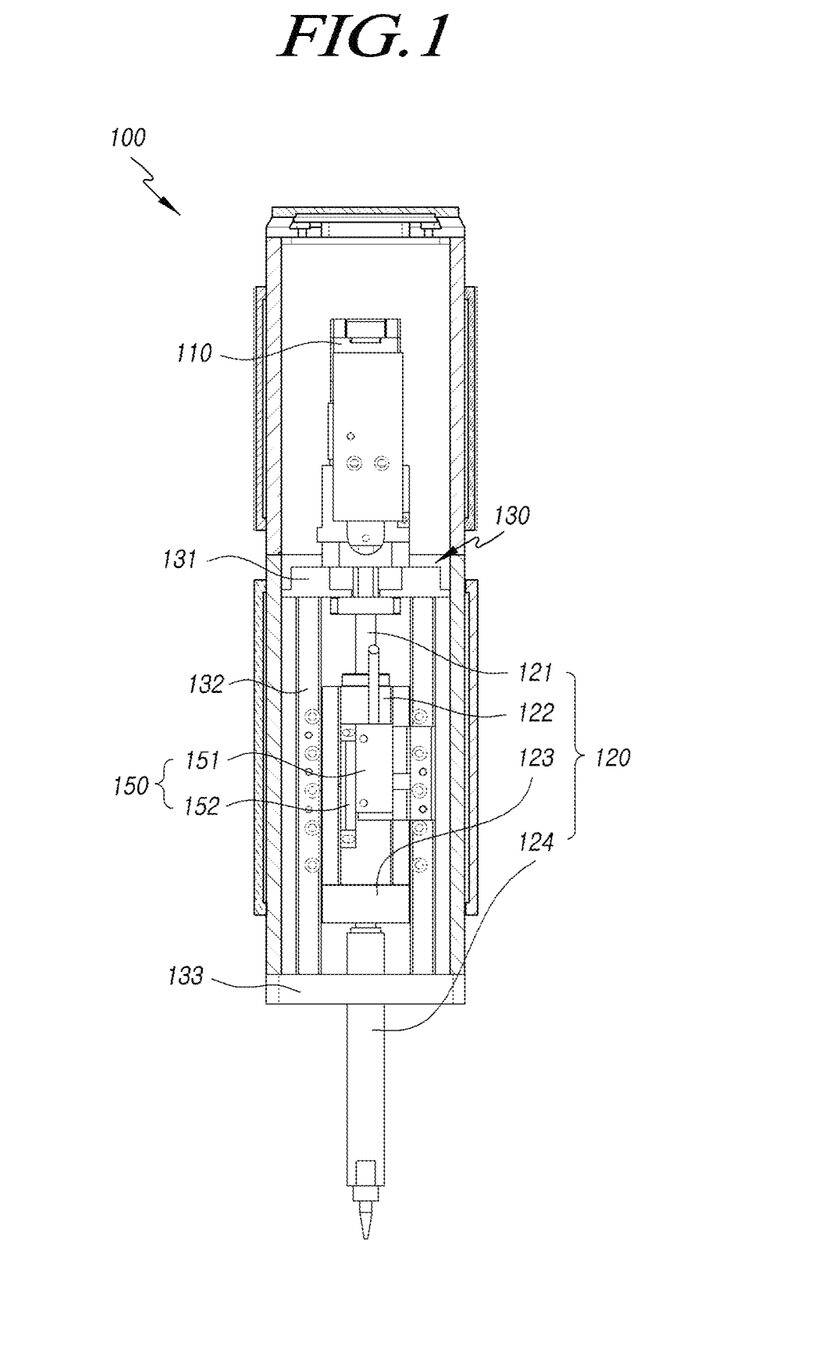
FIG. 1 is a view illustrating an indentation tester.

First, an indentation tester to which the present embodiments may be applied is described with reference to FIG. 1. However, the description of the indentation tester should be understood only as an example, and indentation testers to which the present embodiments may be applied are not necessarily limited thereto.

The indentation tester 100 may include an indentation module 120, a driving unit 110, a displacement sensor 150, and a frame 130.

The indentation module 120 may include a connecting shaft 121, a body 122, a load cell 123, and an indenter shaft 124.

The frame 130 may include a lower frame 133, an upper frame 131, and a pair of middle frames 132 provided to face each other between the lower frame 133 and the upper frame 131.

The upper frame 131 is provided with the driving unit 110, and the connecting shaft 121 passes through the upper frame 131 to connect the main body 122 with the driving unit 110, so that the driving unit 110 applies a load to the indentation module 120.

The indentation module 120 is provided between the middle frames 132, and a sliding supporting member is provided between the main body 122 and the middle frames 132 to support the vertical sliding of the indentation module 120.

Figure 2:
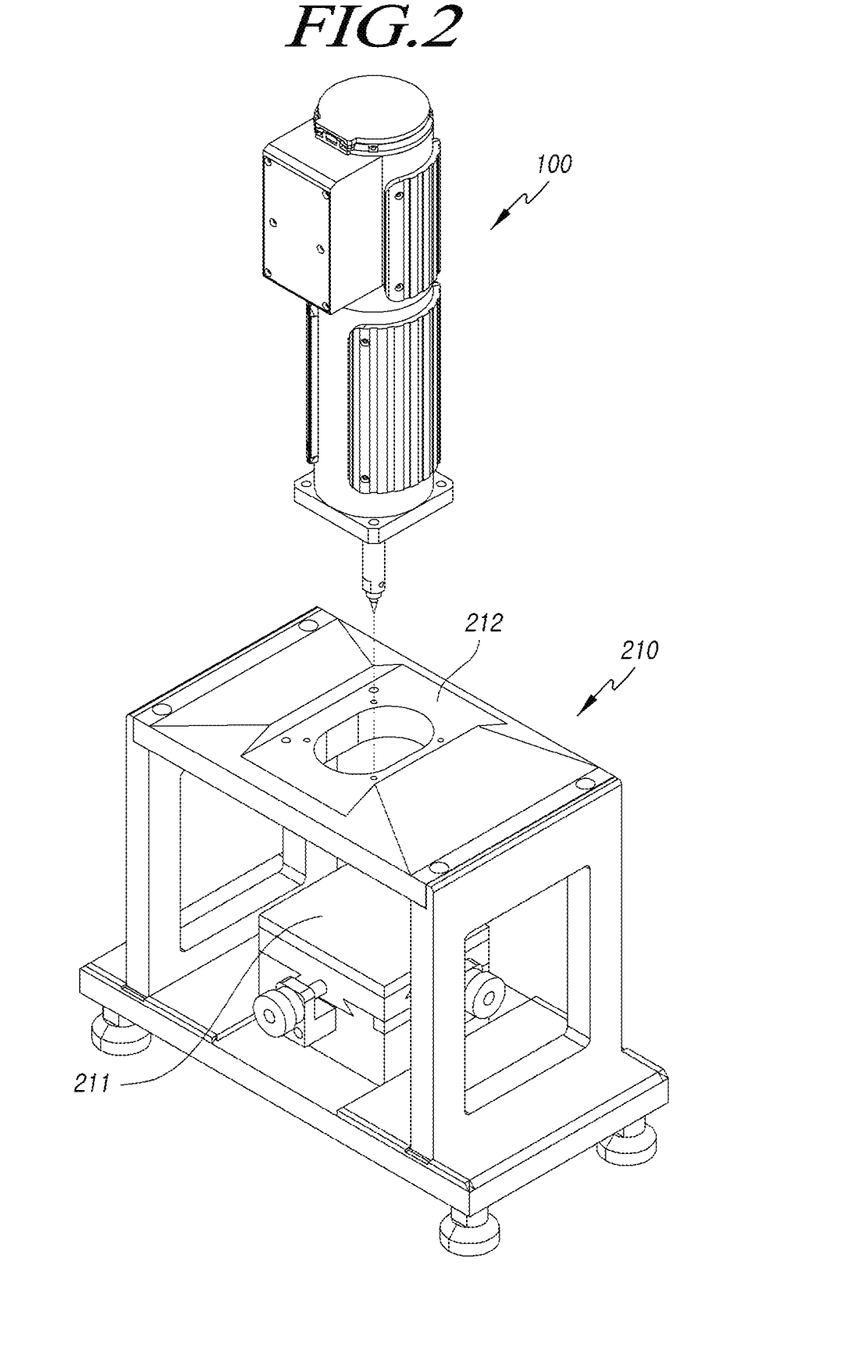
FIGS. 2 to 3 are perspective views illustrating an example in which the indentation tester of FIG. 1 is installed.
Figure 3:
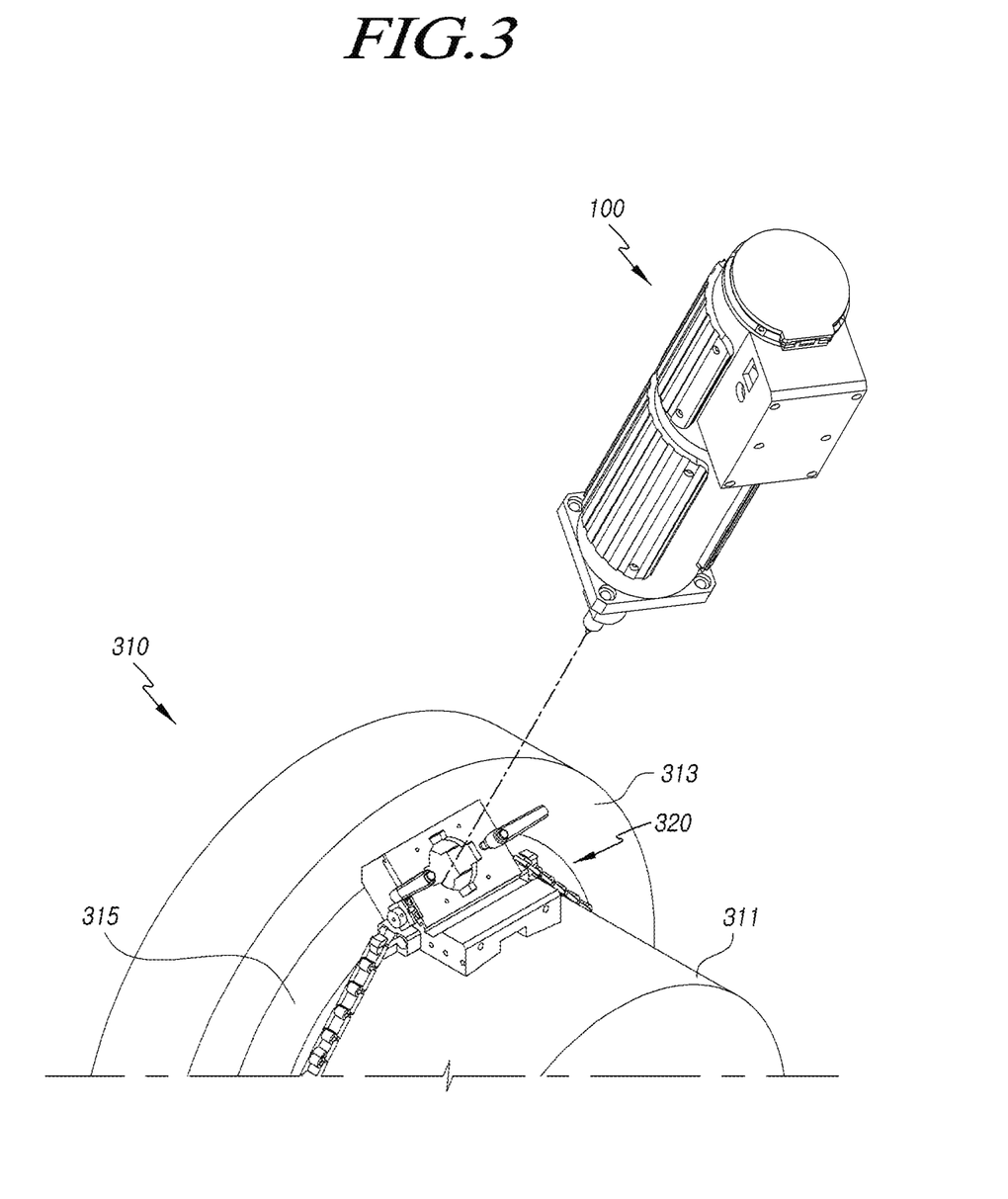

The lower frame 133 is coupled to a test object or a device provided in the test object to fix the indentation tester 100. While performing an indentation test, the indentation tester 100 is coupled to stages 210 including a first stage 211 provided with the test object and a second stage 212 coupled with the lower frame 133 as shown in FIG. 2, or the indentation tester 100 may be coupled to a portable fixing device 320 installed in a structure, e.g., a turbine rotor 310, as shown in FIG. 3.

The turbine rotor 310 may include a shaft 311, a blade 313 perpendicular to the shaft 311, and a connection portion 315 connecting the shaft 311 and the blade 313. As is described below, since the displacement sensor 150 is not coupled to the indenter shaft 124 in the indentation tester 100, the displacement sensor 150 may measure the displacement without sliding even for the connection portion 315 with a curved surface.

However, for convenience, in the detailed description of the present embodiments below, the indentation tester 100 is coupled to the stage 210 to perform the indentation test.

Referring back to FIG. 1, the displacement sensor 150 may include a scale bar 152 coupled to the main body 122 and a sensor 151 coupled to the middle frames 132 to measure the displacement of the indentation module 120. The load cell 123 is provided between the indenter shaft 124 and the main body 122 to measure the load applied by the driving unit 110.

In other words, rather than being coupled to the indenter shaft 124 and positioned below the load cell 123, the displacement sensor 150 is coupled to the main body 122 and the middle frames 132 and positioned above the load cell 123.

In general, the load cell 123 converts the amount of deformation generated as it is compressed or stretched by load and thereby measures the load. Thus, the measured value of the displacement sensor 150 contains the amount of deformation of the load cell 123.

In general indentation tests, even though the amount of deformation of the load cell is not considered when measuring the displacement, it will be interpreted as falling within the error range. However, without considering the amount of deformation of the load cell in indentation tests conducted at a macro scale, the measured value would make a significant difference from the actual displacement. Therefore, for accurate measurement, it is necessary to consider the amount of deformation of the load cell in the measured value of the displacement sensor.

Figure 4:
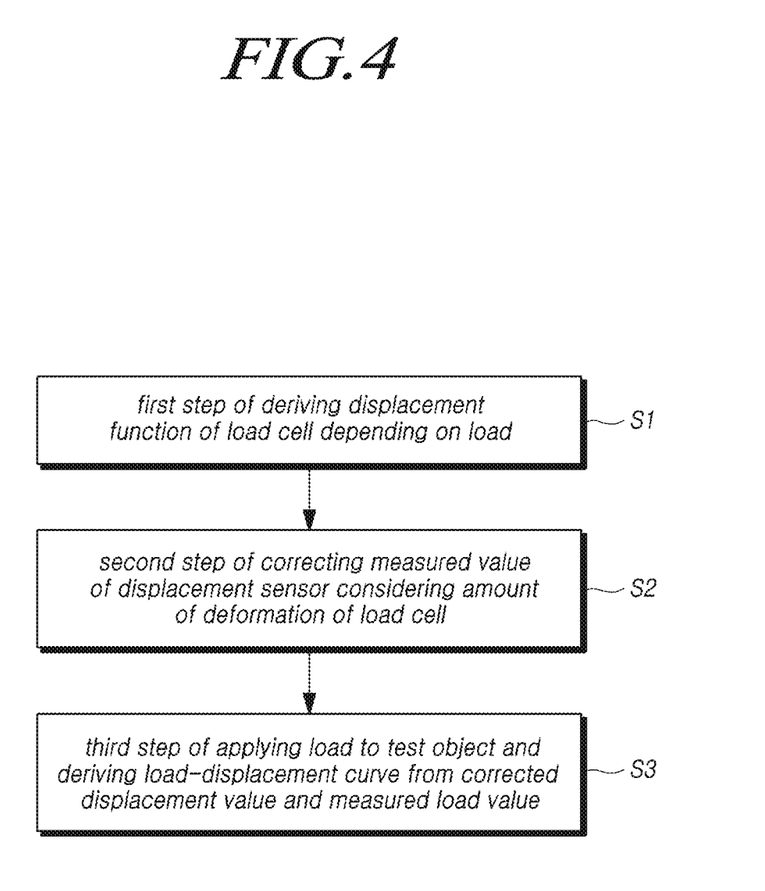
FIG. 4 is a flowchart illustrating a method for performing an indentation test according to the present embodiments.

A method for performing an indentation test considering the amount of deformation of a load cell according to the present embodiments is described below with reference to FIG. 4.

According to the present embodiments, a method for performing an indentation test considering an amount of deformation of a load cell comprises a first step S1 of deriving a displacement function of the load cell 123 according to a load by applying a load to an indentation module 120 and measuring the applied load and a displacement, a second step S2 of correcting a measured value of a displacement sensor 150 considering the amount of deformation of the load cell 123 derived from the displacement function of the load cell 123 according to a load, and a third step S3 of deriving a load-displacement curve from a corrected displacement value and a measured load value by applying a load to a test object 803 with an indenter 801 and measuring the applied load and displacement.

First, the first step S1 is a step for deriving a displacement function of the load cell 123 according to a load, and uses a load value and a displacement value measured by the load cell 123 and the displacement sensor 150 by applying a load to the indentation module 120.

In other words, the first step S1 is a kind of preparation step and is a step for deriving a displacement function of the load cell 123 according to a load to calculate the amount of deformation of the load cell 123 for correcting the measured value of the displacement sensor 150 in the second step S2.

Figure 5:
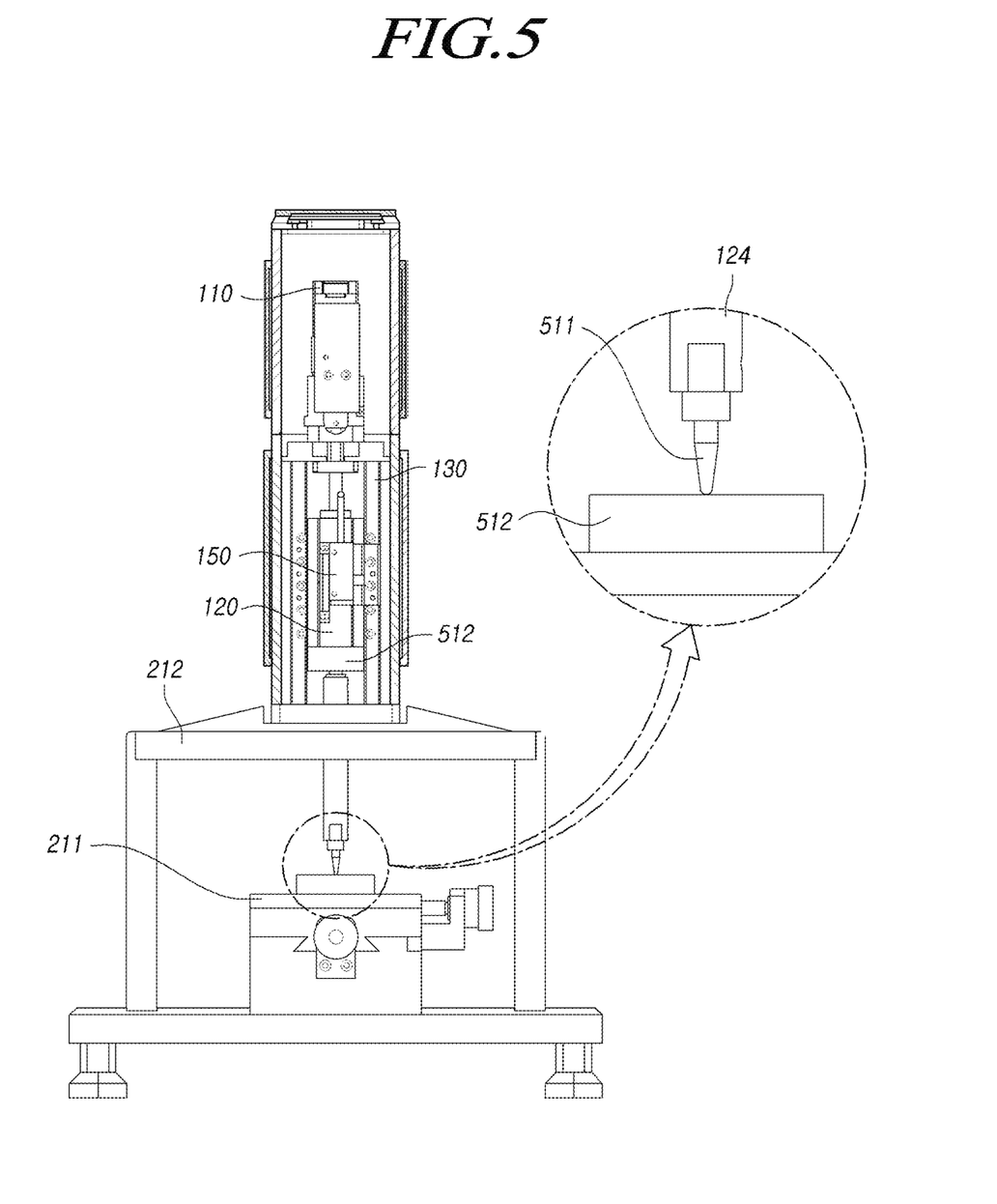
FIG. 5 is a view illustrating a process in which a part of a method for performing an indentation test according to the present embodiments.

Therefore, in the first step S1, it is not necessary to indent the test object 803, and the object 512, on which a flat indenter 511 described below is supported, may be any object on which an indentation test may be performed. For example, the object 512 may be the surface of the first stage 211 without limiting the present embodiments.

Referring to FIG. 5, in the first step S1, the flat indenter 511 is mounted on the indenter shaft 124, and a load is applied to the indentation module 120 so that displacement is not included in the measured value of the displacement sensor 150.

The flat indenter 511 is a component for preventing displacement due to indentation to the object 512 despite application of a load, and includes a punch-type indenter with a flat tip or an indenter with a spherical tip.

However, the punch-type indenter, which comes in surface contact with the object, may not contact the object simultaneously throughout the surface, so that a displacement is inevitable from when a portion thereof is supported on the object to when the rest is supported on the object. Thus, it is preferable to use a spherical indenter that comes in point contact with the object. A spherical indenter with a radius of 5 mm may be mounted and used.

In other words, use of the flat indenter 511 prevents a displacement from occurring in the object 512 although the driving unit 110 applies a load to the indentation module 120, so that the displacement of the object 512 is excluded from the measured value of the displacement sensor 150.

Further, the first step S1 of deriving the displacement function of the load cell 123 according to a load includes the step of measuring the displacement of the indentation module 120 for the frame 130 supporting the sliding of the indentation module 120 and the step of measuring the displacement of the frame 130.

As described above, the displacement sensor 150 includes the scale bar 152 coupled to the main body 122 and the sensor 151 coupled to the middle frames 132. A displacement is caused in the frame 130 by the load applied to the indentation module 120 by the driving unit 110. Thus, to precisely calculate the amount of deformation of the load cell 123, the displacement of the frame 130 needs to be taken into account.

In other words, as the driving unit 110 applies a load to the indentation module 120 downwards, the load cell 123 is compressed, and a displacement occurs in the indentation module 120. Since a displacement is created upwards in the frame 130 coupled with the driving unit 110 by the reaction of the load, the measured value of the displacement sensor 150 includes the amount of deformation of the load cell 123 and the displacement of the frame 130. Without considering the displacement of the frame 130, the load cell 123 would be interpreted as having been further deformed as much as the displacement of the frame 130, resulting in failure to derive an accurate displacement function.

Figure 6:
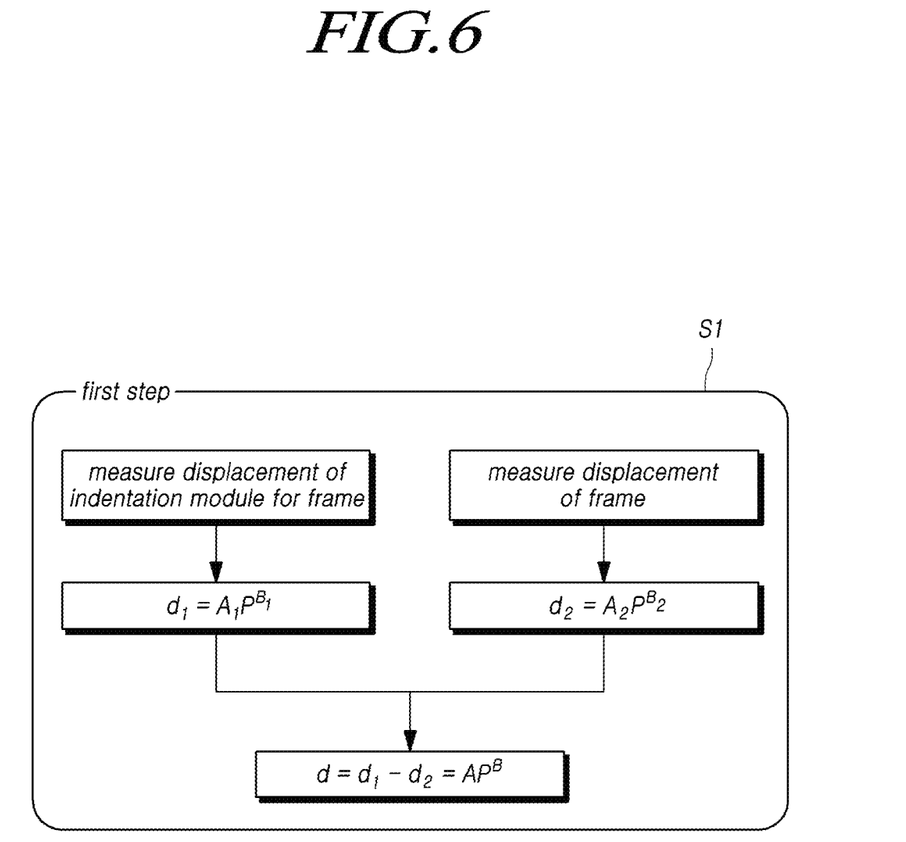
FIG. 6 is a block diagram illustrating a part of a method for performing an indentation test according to the present embodiments.

Referring to FIG. 6, to derive a displacement function of the load cell 123 according to a load in the first step S1, it is needed to subtract the displacement d2 of the frame 130 from the displacement d1 of the indentation module 120 for the frame 130.

First, the displacement d1 of the indentation module 120 for the frame 130 may be measured by the displacement sensor 150 including the scale bar 152 coupled to the main body 122 and the sensor 151 coupled to the middle frames 132 while applying a load.

The displacement d2 of the frame 130 may be measured while applying a load using a conventional indentation tester, in other words, an indentation tester in which a displacement sensor is coupled to the indenter shaft. Although differing in the position of the displacement sensor, they use the flat indenter 511.

After measured, the displacement d1 of the indentation module 120 for the frame 130 and the displacement d2 of the frame 130, each, are fitted to the measured load value, deriving a function.

In other words, the measured displacement d1 of the indentation module 120 for the frame 130 is fitted to the measured load value, and the measured displacement d2 of the frame 130 is fitted to the measured load value. Then, the fitted displacement d2 of the frame 130 is subtracted from the fitted displacement d1 of the indentation module 120 for the frame 130, thereby deriving a displacement function of the load cell 123 according to a load.

As function for fitting the displacements to the load, exponential functions as in Equations 5 and 6 may be used.

$$d_1 = A_1 P^{B_1} \quad \text{[Equation 5]}$$

$$d_2 = A_2 P^{B_2} \quad \text{[Equation 6]}$$

P is the load, and A1, A2, B1, and B2 are constants.

A displacement function of the load cell 123 according to a load is derived by subtracting the displacement d2 of the frame 130 from the fitted displacement d1 of the indentation module 120 for the frame 130 as in Equation 7.

$$d = d_1 - d_2 = AP^B \quad \text{[Equation 7]}$$

d is the amount of deformation of the load cell 123, and A and B are constants.

By deriving the displacement function of the load cell 123 according to a load through Equation 7, the amount of deformation d of the load cell 123 may be calculated not only for the load value applied in the first step S1 but also for other load values.

Figure 7:
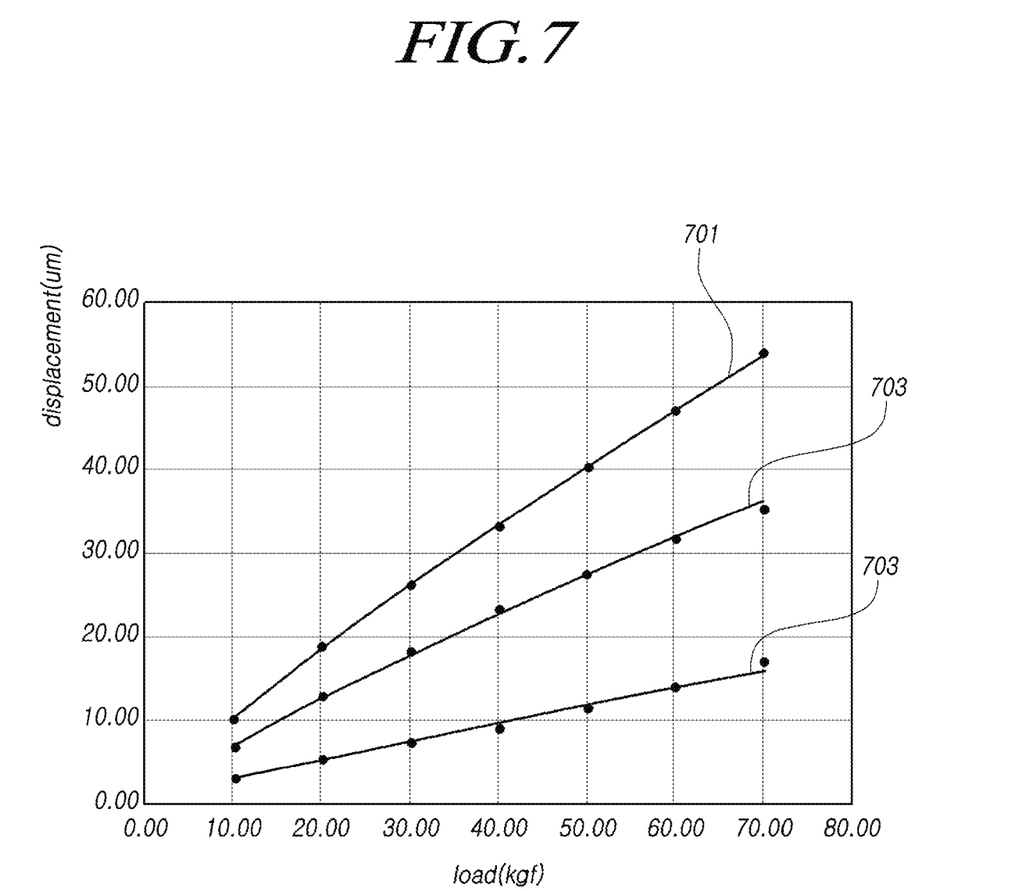
FIG. 7 is a graph illustrating load values and displacement values measured in FIG. 5.

Referring to FIG. 7, the graph indicated by reference number 701 denotes the measured value d1 of the displacement sensor 150, and reference number 705 denotes the displacement d2 of the frame 130. The graph indicated by reference numeral 703 denotes the amount of deformation d of the load cell 123 derived by subtracting the displacement d2 of the frame 130 from the measured value d1 of the displacement sensor 150.

Next, in the second step S2, the measured value of the displacement sensor 150 is corrected considering the amount of deformation of the load cell 123 derived from the displacement function of the load cell 123 according to a load.

As described above, since the amount of deformation of the load cell 123 is included in the measured value of the displacement sensor 150, it is possible to correct the measured value of the Displacement sensor 150 by calculating the amount of deformation of the load cell 123 from the displacement function of the load cell 123 according to a load derived in the first step S1.

$$h_d = h - d \quad \text{[Equation 8]}$$

$h_d$ is a corrected displacement value, h is the measured value of the displacement sensor 150, and d is the amount of deformation of the load cell 123.

Figure 9:
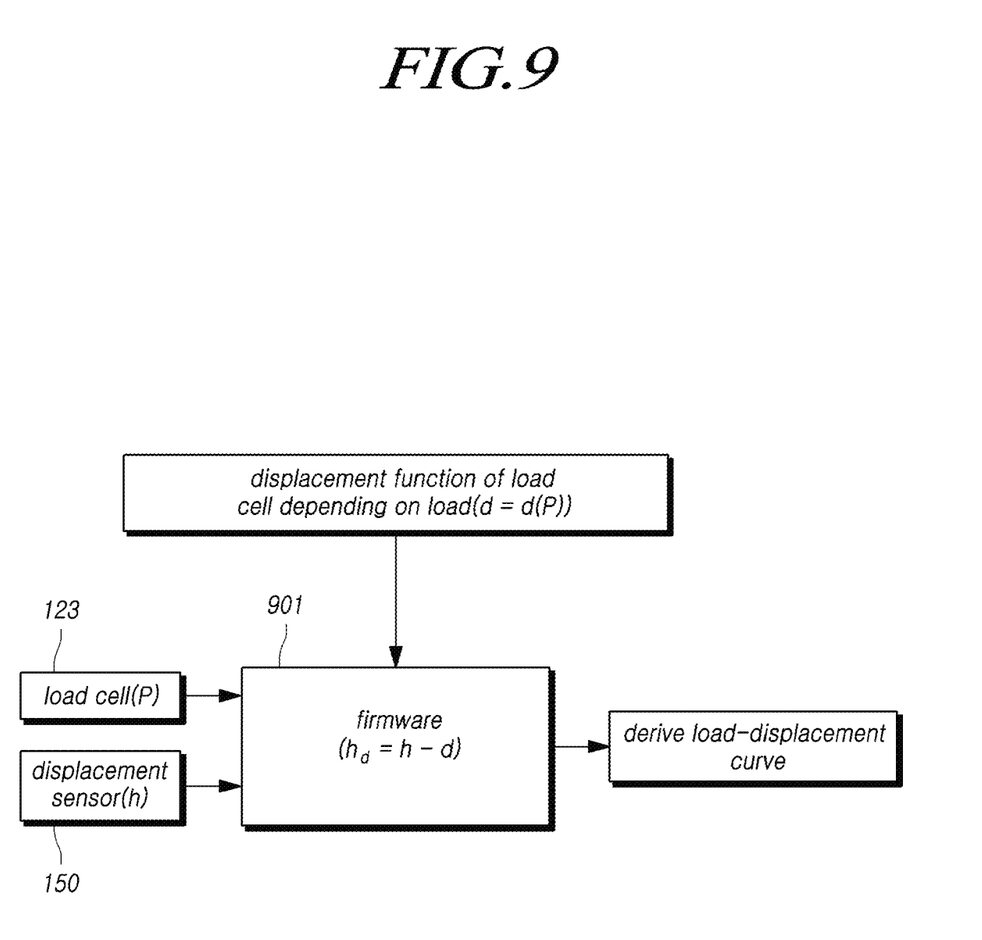
FIG. 9 is a block diagram illustrating a part of a method for performing an indentation test according to the present embodiments.

In other words, as the displacement function of the load cell 123 according to a load, that is, A and B of Equation 7, are input to firmware 901 of the indentation tester 100, the firmware 901 receives the measured values from the displacement sensor 150 and the load cell 123, calculates the amount of deformation (d) of the load cell 123 from the received displacement function of the load cell 123 according to a load and the measured value P of the load cell 123, and subtracts the calculated amount of deformation (d) of the load cell 123 from the measured value h of the displacement sensor 150, thereby deriving the corrected displacement value $h_d$.

The computational processing of the firmware 901 may be performed in real time while applying a load, and therefore, it is possible to obtain, in real time, not only the measured value d of the displacement sensor 150 but also the corrected displacement value $h_d$ derived from the firmware 901 upon performing the indentation test.

In the third step S3, a load is applied to the test object 803 with the indenter 801, and the applied load and displacement are measured, and a load-displacement curve is derived from the measured load value P and the corrected displacement value $h_d$.

Figure 8:
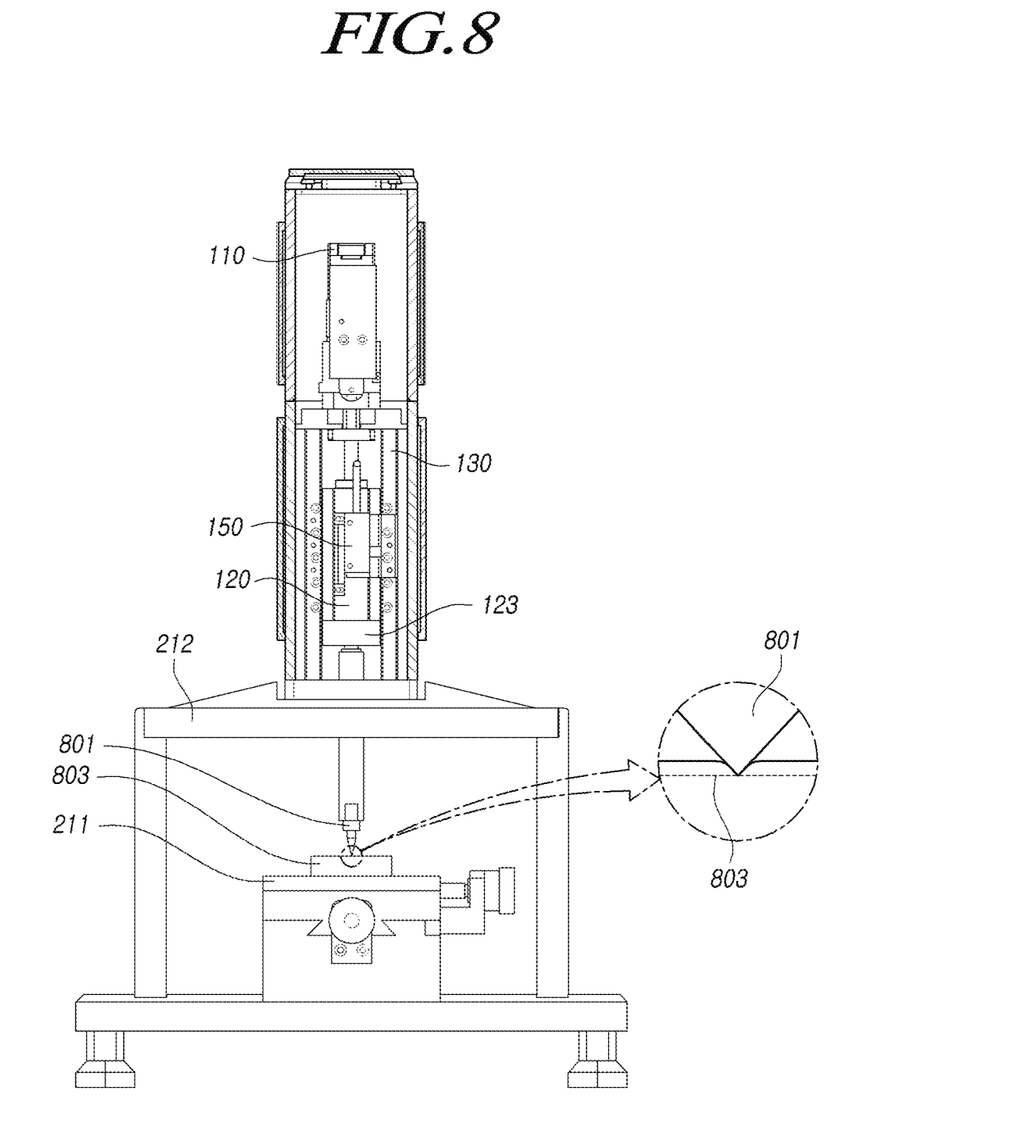
FIG. 8 is a view illustrating a process in which a part of a method for performing an indentation test according to the present embodiments.

Referring to FIG. 8, the indenter 801 is a general indenter for measuring the physical properties of the test object 803, and may adopt, e.g., spherical, Berkovich, or Vickers indenter.

The test object 803 is an object to be subjected to an indentation test to measure physical properties, and may be a specimen provided in the first stage 211, or a structure, such as the turbine rotor 310 to which a portable fixing device 320 is coupled.

By correcting the measured value of the displacement sensor 150 through the first step S1 and the second step S2, the corrected displacement value $h_d$ does not include the amount of deformation (d) of the load cell 123 and, therefore, the load-displacement curve derived from the corrected displacement value $h_d$ and the load value P measured in the third step S3 is freed from the influence of the deformation of the load cell 123.

In other words, if the Oliver method is applied to the indentation tester in which the amount of deformation of load cell is included in the measured value of the displacement sensor, the amount of deformation of the load cell is included in the compliance $C_f$ of the indentation tester, which is treated as a constant irrespective of the load, so that it is impossible to correctly measure physical properties. By applying a method for performing an indentation test according to the present embodiments, it is possible to derive a load-displacement curve freed from influence by the deformation of the load cell 123 by deriving a displacement function according of the load cell 123 to a load and correcting the measured value h of the displacement sensor 150 with the amount of deformation (d) of the load cell 123 calculated from the displacement function. Therefore, it is possible to precisely measure physical properties, such as elastic modulus, while applying the Oliver method.

In other words, referring to FIG. 9, the firmware 901 provided in the indentation tester 100 receives measured values from the load cell 123 and the displacement sensor 150. Since the firmware 901 has a pre-entered displacement function (d=d(P)) (i.e., A and B of Equation 7) according to the load of the load cell 123, it corrects the measured value h of the displacement sensor 150 with the amount of deformation (d) of the load cell 123 calculated through the entered displacement function and the received measured value P of the load cell 123 and derives a load-displacement curve from the measured load value P and the corrected displacement value $h_d$.

Figure 10:
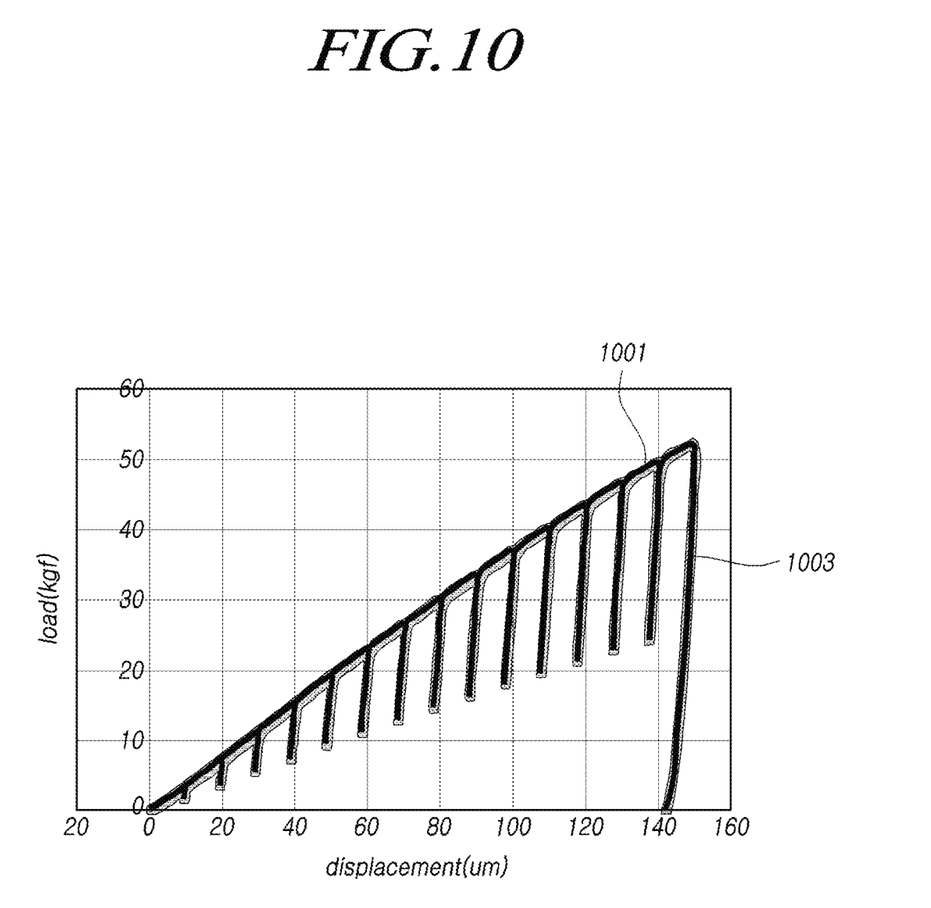
FIG. 10 is a graph illustrating a load-displacement curve derived by the present embodiments as compared with a conventional load-displacement curve.

FIG. 10 shows, for the same object, a load-displacement curve 1001, which is derived using a conventional indentation tester having a displacement sensor coupled to the indenter shaft so that the amount of deformation of the load cell is not included in the measured value, and a load-displacement curve 1001, which is derived by applying an indentation test method according to the present embodiments to an indentation tester having a displacement sensor coupled to the main body and the frame so that the amount of deformation of the load cell is included in the measured value. It may be identified that both the graphs are substantially the same.

In other words, according to the present embodiments, as a displacement function according of the load cell to a load is driven to correct the measured value of the displacement sensor, the same load-displacement curve may be derived although the displacement sensor is positioned above the load cell so that the amount of deformation of the load cell is included in the measured value of the displacement sensor.

After the load-displacement curve is derived considering the amount of deformation of the load cell, it is possible to calculate, e.g., elastic modulus, by the methods as represented in Equations 1 to 4.

Tables 1 and 2 show data obtained by measuring physical properties by applying the present embodiments to the reference specimen HV200 and data obtained by measuring physical properties using a conventional indentation test.

TABLE 1

|  | Yield strength (MPa) | Tensile strength (MPa) | Elastic modulus (GPa) |
| --- | --- | --- | --- |
| first | 362.4 | 778.4 | 224.0 |
| second | 379.9 | 795.2 | 234.0 |
| third | 361.0 | 795.7 | 235.1 |
| average | 367.8 | 789.8 | 231.0 |

TABLE 2

|  | Yield strength (MPa) | Tensile strength (MPa) | Elastic modulus (GPa) |
| --- | --- | --- | --- |
| first | 366.8 | 782.0 | 236.0 |
| second | 365.9 | 782.2 | 233.0 |
| third | 367.1 | 781.1 | 231.0 |
| average | 366.6 | 781.8 | 233.0 |

From comparison between Table 1 and Table 2, it may be seen that the values of yield strength, tensile strength, and elastic modulus are very similar, so that they may be interpreted as falling with the error range. In other words, the method for performing an indentation test according to the present embodiments corrects the measured value of the displacement sensor considering the amount of deformation of the load cell. Thus, it is possible to derive the same load-displacement curve as that of a conventional indentation tester, for an indentation tester in which the amount of deformation of the load cell is included in the measured value of the displacement sensor and to accurately measure physical properties therefrom. Although it is described above that all of the components are combined into one or are operated in combination, embodiments of the disclosure are not limited thereto. One or more of the components may be selectively combined and operated as long as it falls within the scope of the objects of the embodiments.

When an element "comprises," "includes," or "has" another element, the element may further include, but rather than excluding, the other element, and the terms "comprise," "include," and "have" should be appreciated as not excluding the possibility of presence or adding one or more features, numbers, steps, operations, elements, parts, or combinations thereof. All the scientific and technical terms as used herein may be the same in meaning as those commonly appreciated by a skilled artisan in the art unless defined otherwise. It will be further understood that terms, such as those defined dictionaries, should be interpreted as having a meaning that is consistent with their meaning in the context of the relevant art and will not be interpreted in an idealized or overly formal sense unless expressly so defined herein.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

CROSS-REFERENCE TO RELATED APPLICATION

This application claims priority, under 35 U.S.C. 119(a), to Korean Patent Application No. 10-2019-0018684 filed in the Korean Intellectual Property Office on Feb. 18, 2019, the disclosure of which is incorporated by reference herein in its entirety.

The invention claimed is:

1. A method for performing an indentation test in consideration of an amount of deformation of a load cell, the method comprising:

a first step of deriving a displacement function of the load cell according to a load by applying a load to an indentation module and measuring the applied load and a displacement;

a second step of correcting a measured value of a displacement sensor considering the amount of deformation of the load cell derived from the displacement function of the load cell according to a load; and a third step of deriving a load-displacement curve from a corrected displacement value and a measured load value by applying a load to a test object with an indenter and measuring the applied load and displacement, wherein the first step includes, a step of measuring a displacement of the indentation module for a frame supporting sliding of the indentation module; and a step of measuring a displacement of the frame, wherein the displacement function of the load cell according to a load is derived by fitting the measured displacement of the indentation module for the frame to the measured load value, fitting the measured displacement of the frame to the measured load value, and subtracting the fitted displacement of the frame from the fitted displacement of the indentation module for the frame.

2. The method of claim 1, wherein the displacement function of the load cell according to a load is derived with the indentation module equipped with a flat indenter.

\* \* \* \* \*